United States Patent
Kim et al.

(10) Patent No.: US 10,007,322 B2
(45) Date of Patent: Jun. 26, 2018

(54) MULTIMEDIA DEVICE AND POWER MANAGEMENT METHOD THEREOF

(71) Applicant: SAMSUNG ELECTRONICS CO., LTD., Suwon-si, Gyeonggi-do (KR)

(72) Inventors: Ji-won Kim, Seoul (KR); Bong-su Kim, Suwon-si (KR); Eun-young Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 45 days.

(21) Appl. No.: 15/089,811

(22) Filed: Apr. 4, 2016

(65) Prior Publication Data

US 2017/0003731 A1   Jan. 5, 2017

(30) Foreign Application Priority Data

Jul. 3, 2015   (KR) ........................ 10-2015-0095379

(51) Int. Cl.
  *G06F 1/32* (2006.01)
  *A45F 5/10* (2006.01)
  *G06F 1/16* (2006.01)
  *G06F 3/01* (2006.01)
  *G06F 3/041* (2006.01)

(52) U.S. Cl.
  CPC .............. *G06F 1/3265* (2013.01); *A45F 5/10* (2013.01); *G06F 1/1633* (2013.01); *G06F 1/1677* (2013.01); *G06F 1/3218* (2013.01); *G06F 1/3287* (2013.01); *G06F 3/017* (2013.01); *G06F 3/041* (2013.01); *A45F 2200/0516* (2013.01); *A45F 2200/0525* (2013.01); *Y02D 10/171* (2018.01)

(58) Field of Classification Search
  None
  See application file for complete search history.

(56) References Cited

U.S. PATENT DOCUMENTS

| | | | |
|---|---|---|---|
| 2006/0234197 A1* | 10/2006 | Suveizdis | G10H 1/363 434/307 A |
| 2007/0159778 A1 | 7/2007 | Lin et al. | |
| 2015/0049251 A1 | 2/2015 | Boko Dagoun | |
| 2015/0177784 A1 | 6/2015 | Varadarajan et al. | |

FOREIGN PATENT DOCUMENTS

DE   42 33 355   4/1994

* cited by examiner

*Primary Examiner* — Nicholas J Lee
*Assistant Examiner* — Duane N Taylor, Jr.
(74) *Attorney, Agent, or Firm* — Nixon & Vanderhye P.C.

(57) ABSTRACT

A multimedia device for effectively managing power consumption thereof based on a handle that is used when moving the multimedia device is provided. The multimedia device includes a display, a handle attached to the multimedia device, a sensor for sensing the state of the handle, a power supplier, and a controller configured to block power being supplied to the display, when a sensing value of the sensor indicates a state in which the handle is used.

14 Claims, 18 Drawing Sheets

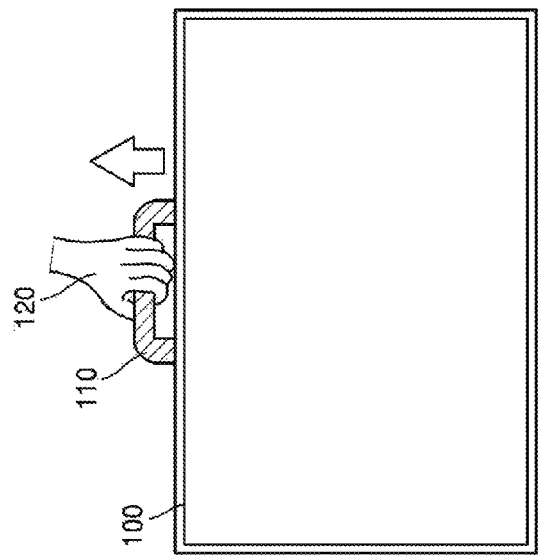
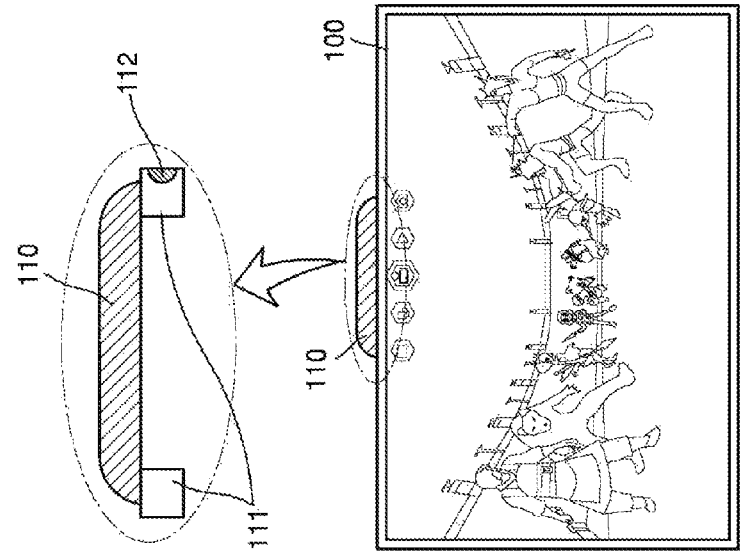
FIG. 1A
FIG. 1B

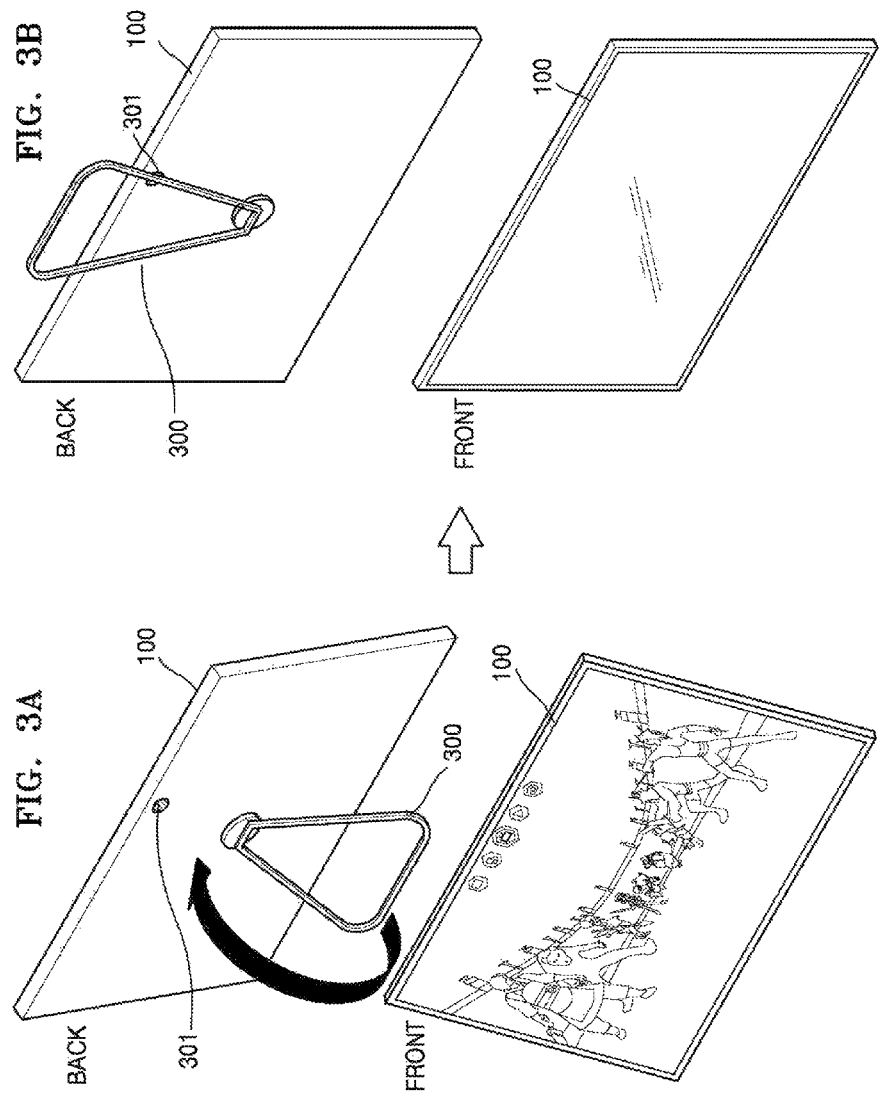

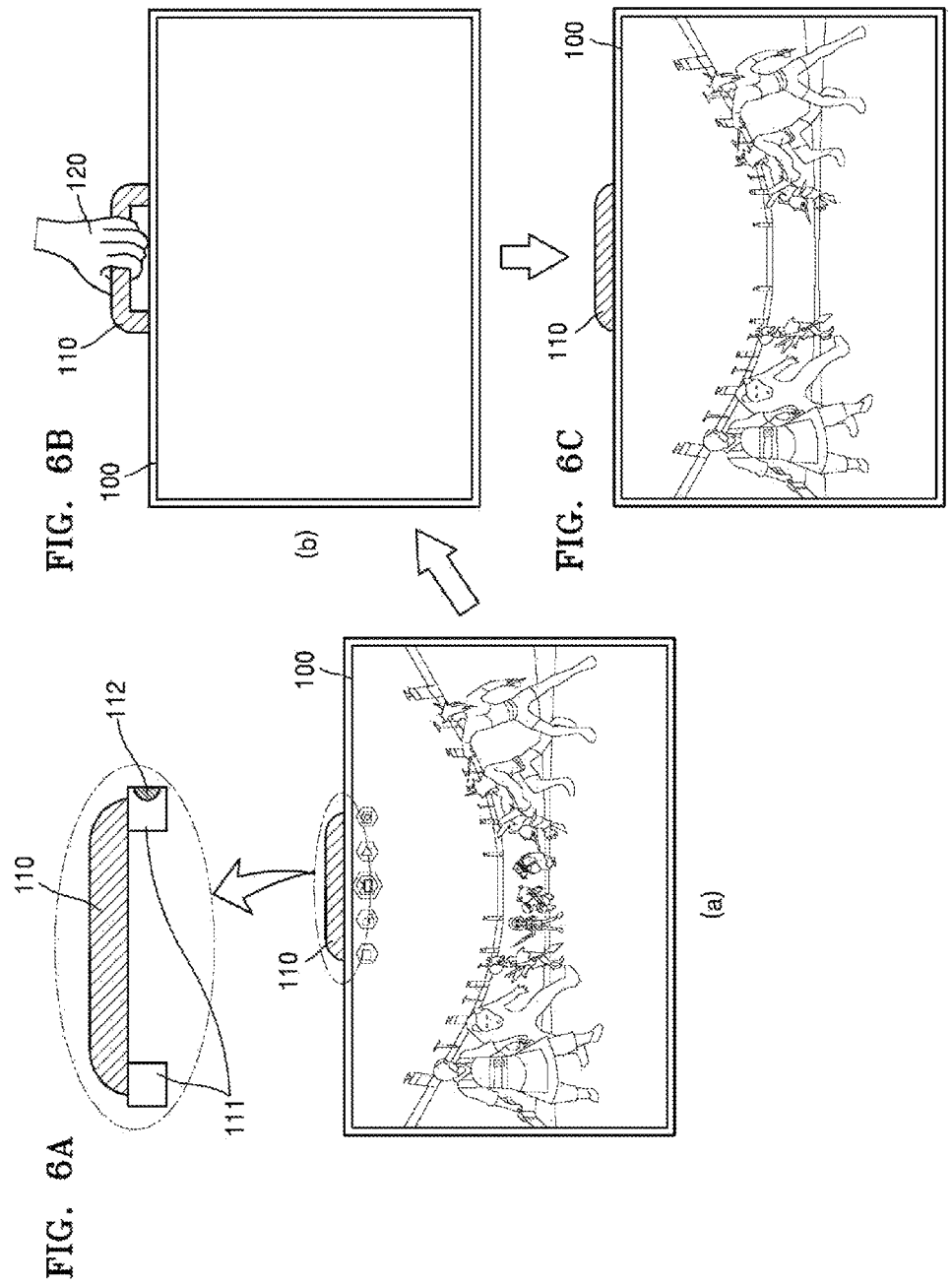

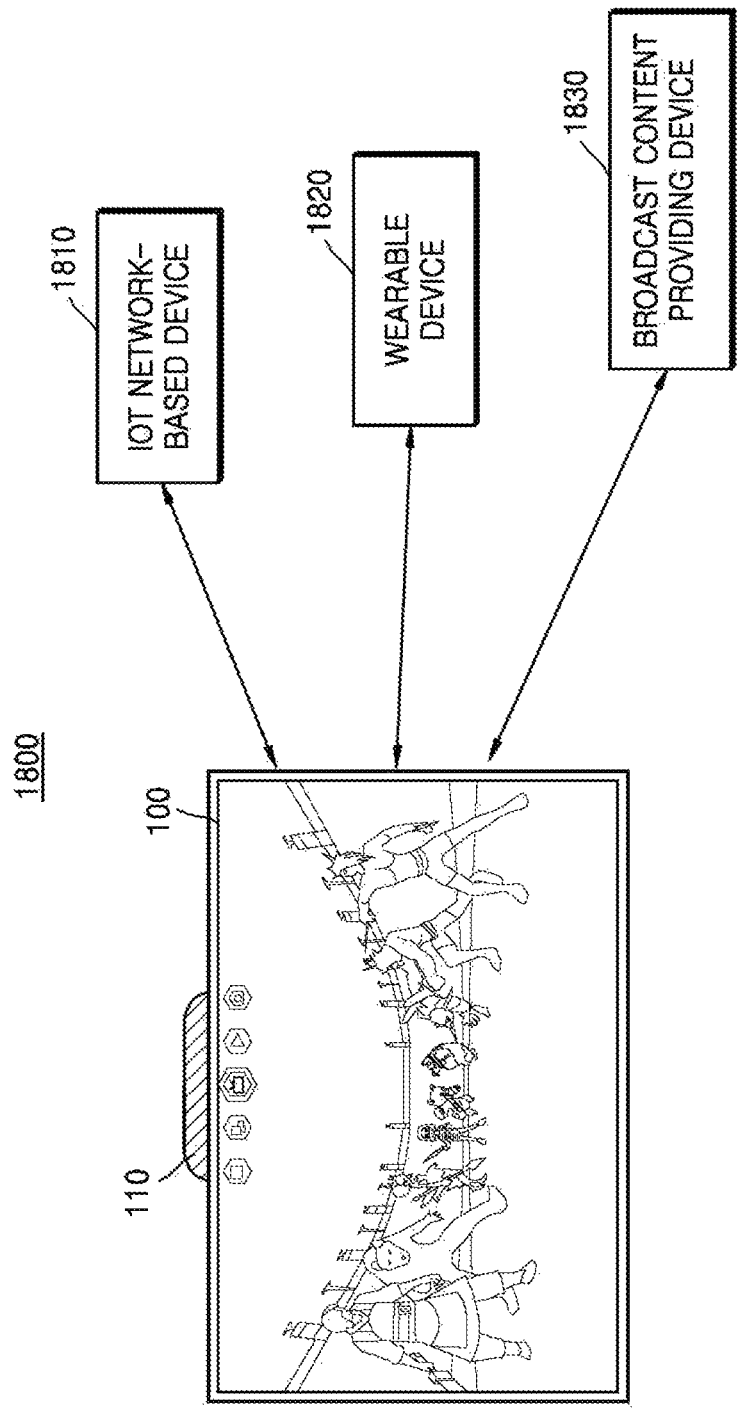

MULTIMEDIA DEVICE AND POWER MANAGEMENT METHOD THEREOF

CROSS-REFERENCE TO RELATED APPLICATION

This application is based on and claims priority under 35 U.S.C. § 119 to Korean Patent Application No. 10-2015-0095379, filed on Jul. 3, 2015, in the Korean Intellectual Property Office, the disclosure of which is incorporated by reference herein in its entirety.

BACKGROUND

1. Field

The present disclosure relates generally to power management of a multimedia device, and for example, to a multimedia device that may manage power while the multimedia device moves and a power management method of the multimedia device.

2. Description of Related Art

As high-definition (HD) multimedia is provided, the number of users that want to receive HD multimedia regardless of time and place is increasing. Accordingly, portable multimedia devices that may provide HD multimedia have been proposed. One such proposed portable multimedia device, for example, is a portable digital television that may provide HD broadcast content.

Since most portable multimedia devices have a built-in battery, technologies that may effectively reduce battery consumption are required.

Information disclosed in this Background section was already known to the inventors before achieving the technical concept or is technical information acquired in the process of achieving the technical concept. Therefore, it may contain information that does not form the prior art that is already known to the public.

SUMMARY

Methods and devices for effectively managing power consumption of a multimedia device, based on a handle that is used when moving the multimedia device are provided.

Methods and devices for effectively managing power consumption of a multimedia device, based on a touch-based input indicating entry of the multimedia device into a power-saving mode are provided.

Methods and apparatuses for effectively managing power consumption of a multimedia device, based on a handle, which is used when moving the multimedia device, and a touch-based input indicating entry into a power-saving mode are provided.

Additional aspects will be set forth in part in the description which follows and, in part, will be apparent from the description.

According to an aspect of an example embodiment, a multimedia device includes a display configured to display multimedia content; a handle attached to the multimedia device; a sensor configured to sense whether the handle is used; a power supply configured to supply power of the multimedia device; and a controller configured to control the power supply to block power being supplied to the display, when a sensing value from the sensor indicates a state in which the handle is used.

According to another aspect of an example embodiment, a method of managing power of a multimedia device includes providing multimedia content using a multimedia device; sensing whether a handle attached to the multimedia device is used; and blocking power being supplied to a display of the multimedia device, when a sensing value indicates a state in which the handle is used.

According to another aspect of an example embodiment, a non-transitory computer-readable recording medium having recorded thereon a program for executing the method is provided.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIGS. 1A and 1B are a diagrams illustrating an example of managing power when moving a multimedia device, based on a state of a handle attached to the multimedia device;

FIGS. 3A and 3B are diagrams illustrating an example of managing the power of a multimedia device when a handle attached to the multimedia device may be used as a stand for the multimedia device;

FIGS. 6A-6C are diagrams illustrating an example of blocking or supplying power to a display of a multimedia device in the case that a handle is attached to the multimedia device;

FIGS. 11A-11C are diagrams illustrating an example in which a multimedia device manages the power of the multimedia device based on a touch-based input indicating entry into a power-saving mode and a handle;

FIG. 18 is a configuration diagram illustrating an example system including a multimedia device.

DETAILED DESCRIPTION

Figure 2:
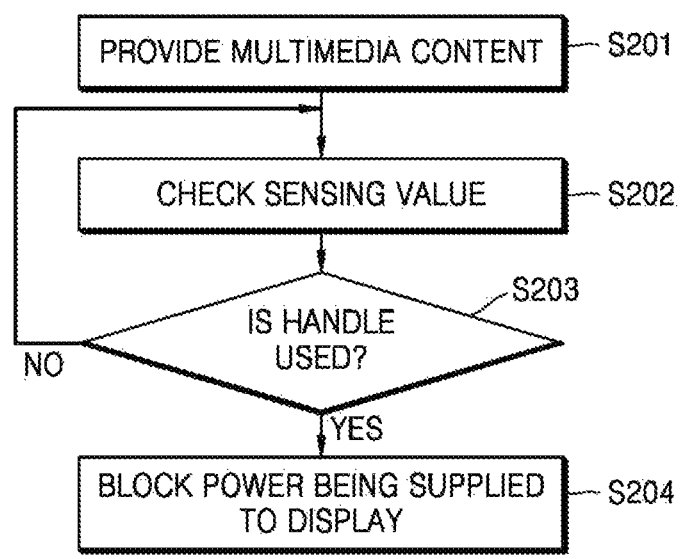
FIG. 2 is a flowchart illustrating an example method of managing the power of a multimedia device by blocking power, which is provided to a display, when a handle attached to the multimedia device is used.

The present disclosure will now be described in greater detail with reference to the accompanying drawings, in which example embodiments of the present disclosure are shown. The present disclosure may, however, be embodied in many different forms and should not be construed as being limited to the example embodiments set forth herein; rather, these example embodiments are provided so that this disclosure will be thorough and complete, and will convey the concept of the disclosure to those of ordinary skill in the art. Like reference numerals in the drawings denote like elements.

When it is described through the disclosure that a certain element is "connected" to another element, it may be understood that the certain element may be "connected" to another element directly or via another element in between. In addition, it will be further understood that the terms "comprises", "comprising", "includes", and/or "including" when used herein, specify the presence of stated features, integers, steps, operations, elements, components, or combinations thereof but do not preclude the presence or addition of one or more other features, integers, steps, operations, elements, components, or combinations thereof. As used herein, the term "and/or" includes any and all combinations of one or more of the associated listed items.

Hereinafter, one or more example embodiments will be described in greater detail with reference to accompanying drawings.

FIGS. 1A and 1B are diagrams illustrating an example of managing power when moving a multimedia device 100, based on a handle 110 attached to the multimedia device 100.

Referring to FIG. 1A, the multimedia device 100 may, for example, be a portable digital television having a handle 110 attached thereto. However, the multimedia device 100 is not limited thereto. For example, the multimedia device 100 may include a portable multimedia player, a portable terminal, or an internet of things (IoT) network-based device, which includes a handle attached thereto and a display.

The multimedia device 100 may have such a size that the handle 110 is required to move the multimedia device 100. For example, the size of the multimedia device 100 may be 15 inches, 17 inches, 19 inches, or 27 inches, but is not limited thereto. The above-described size of the multimedia device 100 may be based on the size of a display included in the multimedia device 100.

In the present example embodiment, the state of the handle 110 may include at least one of a state in which the handle 110 is used (e.g., has a force applied thereto) and a state in which the handle 110 is not used.

In the present example embodiment, the state in which the handle 110 is used may be a state in which the handle 110 is grasped with a hand. In the present example embodiment, the state in which the handle 110 is grasped with a hand may be a state in which the handle 110 is grasped to move the multimedia device 100.

In the present example embodiment, the state in which the handle 110 is not used may be a state in which the handle 110 is not grasped with a hand. In the present example embodiment, the state in which the handle 110 is not grasped with a hand may be a state in which the multimedia device 110 is not moved.

Since the handle 110 may be grasped, the handle 110 may, for example, be referred to as a handhold portion. A form of the handle 110 when grasping the handle 110 with a hand may be different from that of the handle 110 when not grasping the handle 110 with a hand.

For example, when the handle 110 is not used, the handle 110 may adhere closely to the multimedia device 100. When a hand is inserted between the handle 110 and the multimedia device 100 to grasp the handle 110 in a state in which the handle 110 adheres closely to the multimedia device 100, the form of the handle 110 may be a form standing on the multimedia device 100 or being pulled out or extended from the multimedia device 100. However, the present example embodiment is not limited thereto.

For example, as illustrated in FIG. 1A, when the handle 110 is grasped with a hand in the state in which the handle 110 adheres closely to the multimedia device 100, the form of the handle 110 may be changed so that an interval between the hand 120 grasping the handle 110 and the multimedia device 100 increases as illustrated in FIG. 1B.

As illustrated in FIG. 1A, the handle 110 may be attached to the multimedia device 100 using, for example, a connection unit 111. The connection unit 111 may be fixedly attached to the multimedia device 1100. The connection unit 111 may include a material that is the same as that of the handle 110 or the exterior of the multimedia device 100. However, the connection unit 111 may include a material that is different from that of the handle 110 or the exterior of the multimedia device 100.

The handle 110 may include a material that is the same as that of the exterior of the multimedia device 100. For example, both the handle 110 and the exterior of the multimedia device 100 may include a plastic material. The handle 110 may include a material that is different from that of the exterior of the multimedia device 100. For example, the exterior of the multimedia device 100 may include a plastic material, and the handle 110 may include a material, such as leather, synthetic leather, cloth, or iron, or the like.

When the handle 110 is not used, a portion of the handle 110 may be inserted in the inside of the connection unit 111. In this example, when the handle 110 is not used, the handle 110 may adhere closely to the multimedia device 100. When the handle 110 is grasped with a hand, the portion of the handle 110, inserted in the inside of the connection unit 111, may be pulled out or extended, and thus, the form of the handle 110 may be changed as illustrated in FIG. 1B.

In the present example embodiment, the sensor 112 senses whether the handle 110 is used or not. The sensor 112 may be mounted inside the connection unit 111. However, in the present example embodiment, the mounting position of the sensor 112 is not limited thereto.

In the present example embodiment, the sensor 112 may include, for example, an on/off switch. The sensor 112 may be turned on when the handle 110 is pulled out or extended from the connection unit 111. However, in the present example embodiment, the operation of the sensor 112 is not limited thereto. For example, the sensor 112 may be turned off when the handle 110 is pulled out or extended from the connection unit 111.

In the present example embodiment, the sensor 112 is not limited to the on/off switch. For example, the sensor 112 may include a light sensor. When the sensor 112 includes a light sensor including a light emitting portion and a light receiving portion, the handle 110 may receive light that is emitted from the light emitting portion when the handle 110 is pulled out from the connection unit 111, and thus may sense an operation in which the handle 110 is pulled out from the connection unit 111.

A sensing value that is output from the sensor 112 may be transmitted to the multimedia device 100. The multimedia device 100 may determine whether the handle 110 is used, based on the sensing value of the sensor 112. When the handle 110 is used, the multimedia device 100 may block power being provided to a display of the multimedia device 100, as illustrated in FIG. 1B.

In the present example embodiment, the handle 110 may be configured to be inserted in or pulled out from the inside of the multimedia device 100 without the connection unit 111. In this example, the sensor 112 may be mounted in a portion of the multimedia device 100 in which the handle 110 is inserted.

FIG. 2 is a flowchart illustrating an example method of managing the power of the multimedia device 100 by blocking power being provided to a display, when the handle 110 attached to the multimedia device 100 is used.

In operation S201, the multimedia device 100 provides multimedia content. The multimedia content may include, for example, broadcast content, Internet-based content, photos, videos, music, or text, or the like. In the present example embodiment, the multimedia content is not limited thereto. When images are included in multimedia content that is provided by the multimedia device 100, the providing of the multimedia content may include displaying multimedia.

The multimedia device 100 may provide multimedia content that is received from the outside. The multimedia content that is received from the outside may include, for example, broadcast content. The multimedia content that is received from the outside may include, for example, content that is received from an IoT network-based device (e.g., a smart appliance or smart office equipment).

For example, when the IoT network-based device is a smart oven, the multimedia content that is received from the outside may include cooking content based on cooking recipes stored in the smart oven. For example, when the IoT network-based device is a self-treatment device, the multimedia content that is received from the outside may include self-treatment content based on medical information of a user.

The multimedia device 100 may provide multimedia content stored in the multimedia device 100. In this example, the multimedia device 100 may provide multimedia content stored in the multimedia device 100, based on user input data input using a user input unit of the multimedia device 100 or/and information received from an external device.

The user input received using the user input unit of the multimedia device 100 may include, for example, a search word (e.g., title, actor name, or genre) about multimedia content that is desired by users.

The Information received from the external device may include user information measured from a wearable device such as a smart watch. The multimedia device 100 may search multimedia content using the user information, received from the external device, as a keyword and provide searched multimedia content. For example, when the user Information received from the external device is body temperature information of a user, the multimedia device 100 may search medical information related to body temperature information from multimedia content stored in the multimedia device 100 and provide searched multimedia content.

When the multimedia device 100 provides the searched multimedia content, the multimedia device 100 checks a sensing value of the sensor 112 (operation S202).

In operation S203, the multimedia device 100 determines whether the handle 110 is used, based on the checked sensing value. To determine whether the handle 110 is used, based on the sensing value, the multimedia device 100 may use, for example, previously set reference information.

For example, when a sensing value output from the sensor 112 indicates an On-state in a case in which the sensor 112 is an on/off switch and is configured to be turned on when the handle 110 is used, the reference information may include information by which the multimedia device 100 may determine that the handle 110 is used. In addition, when the sensing value output from the sensor 112 indicates an Off-state, the reference information may include information by which the multimedia device 100 may determine that the handle 110 is not used. The reference information may be referred to as condition information for determining the state of the handle 110 based on a sensing value.

If it is determined that the handle 110 is not used (operation S203), the multimedia device 100 may provide multimedia content and perform a process of checking a sensing value of the sensor 112 again (operation S202).

If it is determined that the handle 110 is used (operation S203), the multimedia device 100 may block power being provided to a display, and enter a power-saving mode (operation S204).

FIGS. 3A and 3B are diagrams illustrating an example of managing the power of a multimedia device 100 when a handle 300 attached to the multimedia device 100 may be used as a stand for the multimedia device 100.

Referring to FIG. 3A, when the multimedia device 100 provides multimedia content, the handle 300 may act, for example, as a stand for the multimedia device 100. A form of the handle 300 which may act as a stand for the multimedia device 100 may be referred to, for example, as a state in which the handle 300 is unfolded.

A state of the handle 300 illustrated in FIG. 3B may be referred to as a folded state. When the state of the handle 300 is changed from an unfolded state as illustrated in FIG. 3A to a folded state as illustrated in FIG. 3B, the multimedia device 100 may block power being provided to a display, and enter a power-saving mode.

A sensor 301 senses whether the handle 300 is used or not. Referring to FIG. 3A and FIG. 3B, the sensor 301 may be installed in a portion of a surface of the multimedia device 100 which may be touched when the handle 300 is folded. The sensor 301 may include an on/off switch, like the sensor 112 of FIG. 1. However, in the present example embodiment, the sensor 301 is not limited thereto. For example, the sensor 301 may include a proximity sensor or a contact sensor. When the sensor 301 includes a proximity sensor or a contact sensor, the sensor 301 may output a sensing value indicating that the handle 300 is used, as the handle 300 is unfolded.

The multimedia device 100 may determine whether the handle 300 is used, based on a sensing value output from the sensor 301. To this end, the multimedia device 100 may use reference information or condition information to determine whether the handle 300 is used, based on a sensing value.

The reference information and the condition information may be similar to the reference information and the condition information, respectively, described above with reference to FIG. 2. The reference information or the condition information may be previously stored in the multimedia device 100. The reference information or the condition information may be changed or set according to a user input.

When it is determined that the handle 300 is used, based on the sensing value, the multimedia device 100 may block power being provided to a display, and enter a power-saving mode.

FIGS. 4A-4D are diagrams illustrating other examples of a handle that is attached to a multimedia device 100.

Figure 4A:
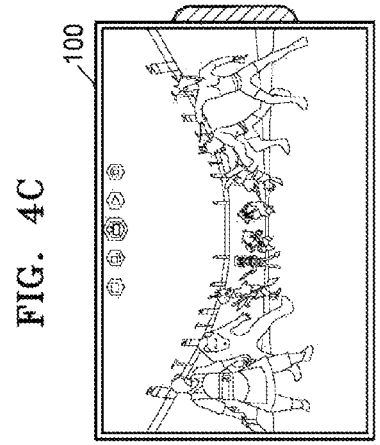
FIGS. 4A-4D are diagrams illustrating examples of a handle that is attached to a multimedia device.

Referring to FIG. 4A, an example in which handles are attached to left and right sides of the multimedia device 100 is illustrated. In the example of FIG. 4A, a sensor for sensing whether a handle is used or not may be installed at a position close to each of the handles attached to the left and right sides of the multimedia device 100. When it is determined that at least one of the handles attached to the left and right sides is used, the multimedia device 100 may block power being provided to a display, and enter a power-saving mode.

Figure 4B:
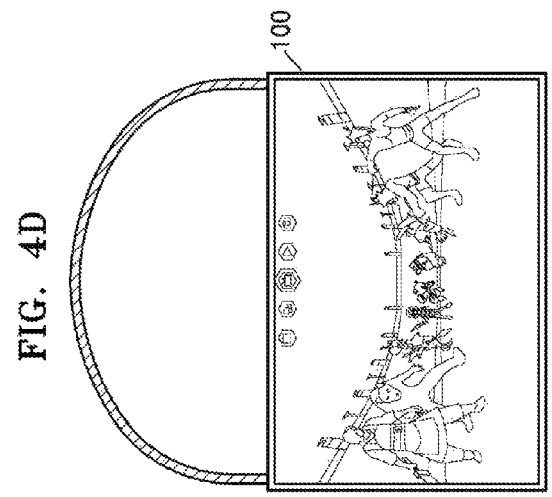

Referring to FIG. 4B, an example in which a handle is attached to a left side of the multimedia device 100 is illustrated. In the example of FIG. 4B, a sensor for sensing whether a handle is used or not may be installed at a position close to the handle attached to the left side of the multimedia device 100. When it is determined that the handle attached to the left side is used, the multimedia device 100 may block power being provided to a display, and enter a power-saving mode.

Figure 4C:
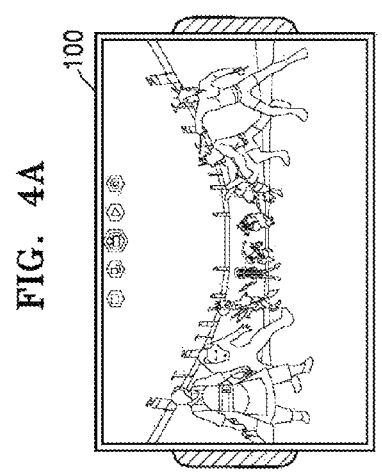

Referring to FIG. 4C, an example in which a handle is attached to a right side of the multimedia device 100 is illustrated. In the example of FIG. 4C, a sensor for sensing whether a handle is used or not may be installed at a position close to the handle attached to the right side of the multimedia device 100. When it is determined that the handle attached to the right side is used, the multimedia device 100 may block power being provided to a display, and enter a power-saving mode.

Figure 4D:
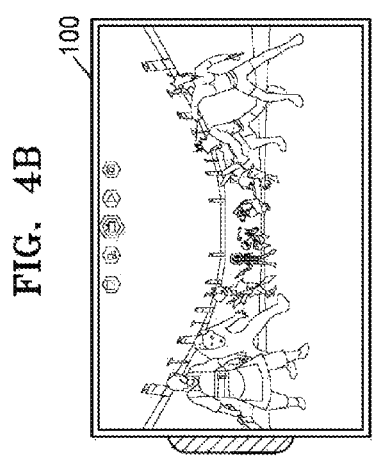

Referring to FIG. 4D, an example in which a handle is attached to the multimedia device 100 in the form of a strap is illustrated. In the example of FIG. 4D, a sensor for sensing whether a handle is used or not may be attached to a connection unit for connecting the handle to the multimedia device 100 or a portion of a surface of the handle which is opposite to the multimedia device 100.

In the cases of FIGS. 4A, 4B, 4C, and 4D, the multimedia device 100 may have reference information or condition information for determining whether a handle is used or not, based on a sensing value. The reference information and the condition information may be similar to the reference information and the condition information, respectively, described above with reference to FIG. 2. The reference information or the condition information may be determined based on a sensor mounted in the multimedia device 100.

Figure 5:
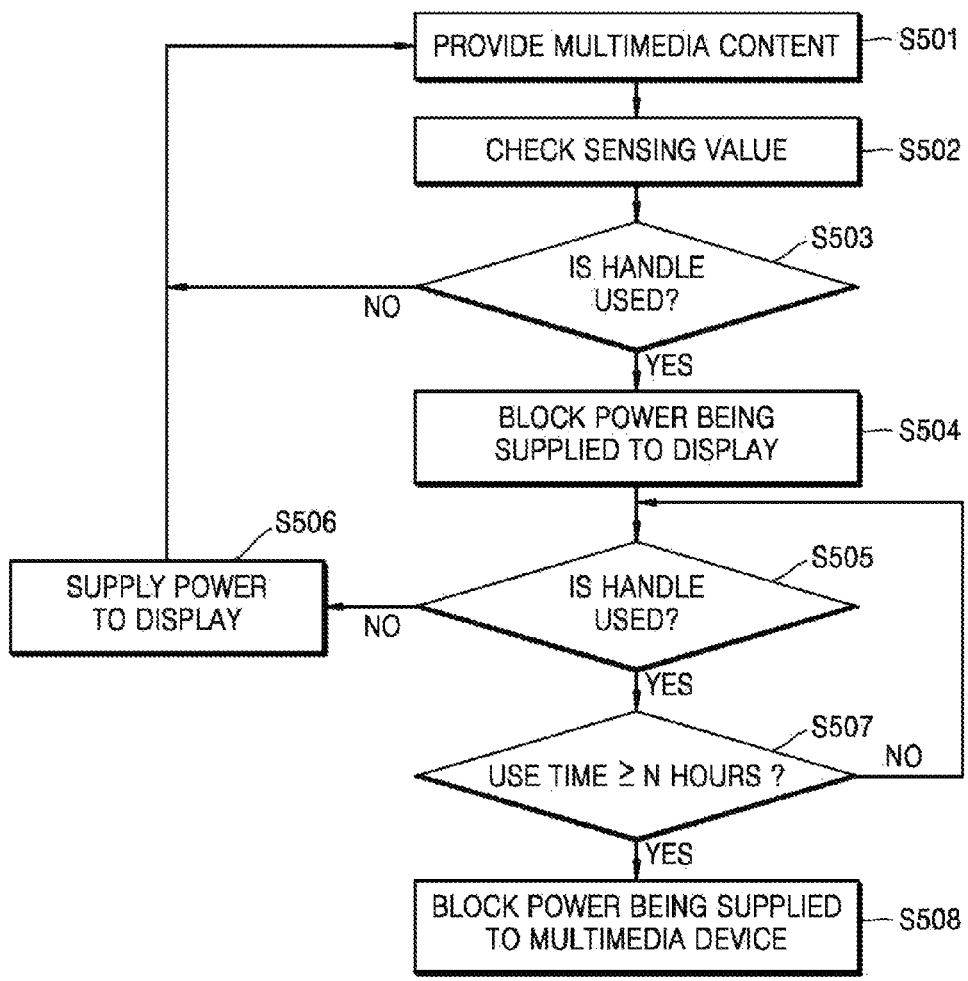
FIG. 5 is a flowchart illustrating an example method of managing the power of a multimedia device based on a time during which a handle attached to the multimedia device is used.

FIG. 5 is a flowchart illustrating an example method of managing the power of the multimedia device 100 based on a time during which the handle 110 attached to the multimedia device 100 is used.

In operation S501, the multimedia device 100 provides multimedia content. In operation S501, the multimedia device 100 may provide multimedia content that is received from the outside or provide multimedia content stored in the multimedia device 100, as described in operation S201 of FIG. 2.

In operation S502, the multimedia device 100 checks a sensing value of the sensor 112. If it is determined that the handle 110 is not used, based on the sensing value (operation S503), the multimedia device 100 may proceed to operation S501 and repeatedly perform a process of providing multimedia content and checking a sensing value.

If it is determined that the handle 110 is used (operation S503), the multimedia device 100 may block power being provided to a display, and enter a power-saving mode (operation S504).

After entering the power-saving mode, the multimedia device 100 may determine whether the handle 110 is used or not, based on a sensing value (operation S505). If it is determined that the handle 110 is not used, the multimedia device 100 provides power to the display in operation S506 and provides multimedia content in operation S501.

In the example that the multimedia device 100 provides real time broadcast content in operation S501, when an operation of the multimedia device 100 is returned from operation S506 to operation S501, the multimedia device 100 may provide real time broadcast content in operation S501. In the example that the multimedia device 100 provides multimedia content stored in the multimedia device 100, in operation S501, when an operation of the multimedia device 100 is returned from operation S506 to operation S501, the multimedia device 100 may provide multimedia content which is subsequent to the multimedia provided when blocking or just before blocking power being provided to the display, in operation S504, in operation S501.

If it is determined that the handle 110 is used (operation S505), the multimedia device 100 may compare a time, during which a sensing value indicating a state in which the handle 110 is used remains constant, to a previously set reference time N, and determine whether the time during which the sensing value remains constant is equal to or greater than the reference time N (operation S507). For example, the reference time N is an integer. For example, the reference time N may be set to 30 minutes. The reference time N may be set or changed by a user. To perform operation S507, the multimedia device 100 may measure the time during which the sensing value remains constant. The time, during which the sensing value indicating a state in which the handle 110 is used remains constant, may be referred to as a use time for which the handle 110 is used.

If it is determined that the duration time during which the sensing value remains constant is not greater than the reference time N (operation S507), the multimedia device 100 may proceed to operation S505 and determine whether the handle 110 is used or not, until the duration time during which the sensing value remains constant is equal to or greater than the reference time N.

If it is determined that the duration time during which the sensing value remains constant is equal to or greater than the reference time N (operation S507), the multimedia device 100 may block power being supplied to the multimedia device 100 (operation S508). Accordingly, power being supplied to all elements of the multimedia device 100 which include a display of the multimedia device 100, may be blocked.

FIGS. 6A-6C are diagrams illustrating an example in which, in the case that a handle 110 as shown in FIG. 1 is attached to a multimedia device 100, power being supplied to a display of the multimedia device 100 is blocked when it is determined that the handle 110 is used, and then power is supplied to the display of the multimedia device 100 when it is determined that the handle 110 is not used, and the multimedia device 100 provides multimedia content.

FIG. 6A illustrates a state in which the multimedia device 100 provides multimedia content and the handle 110 is not used. FIG. 6B illustrates a state in which as the handle 110 is used, power being supplied to the display of the multimedia device 100 is blocked and thus multimedia content is not provided. FIG. 6C illustrates a state in which the handle 110 is not used is sensed after power being supplied to the display of the multimedia device 100 has been blocked, power is supplied to the display of the multimedia device 100 and the multimedia device 100 provides multimedia content again.

Figure 7C:
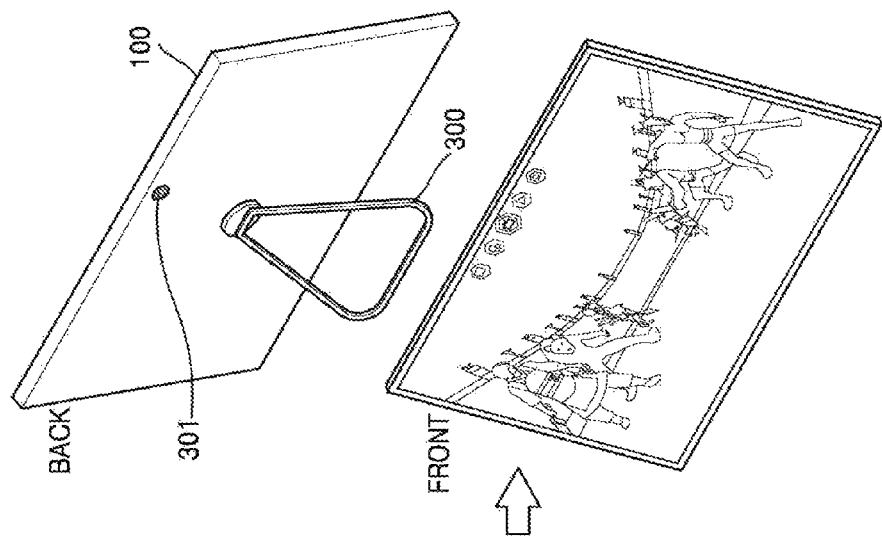
FIGS. 7A-7C are diagrams illustrating another example of blocking or supplying power to a display of a multimedia device in the case that a handle is attached to the multimedia device.
Figure 7B:
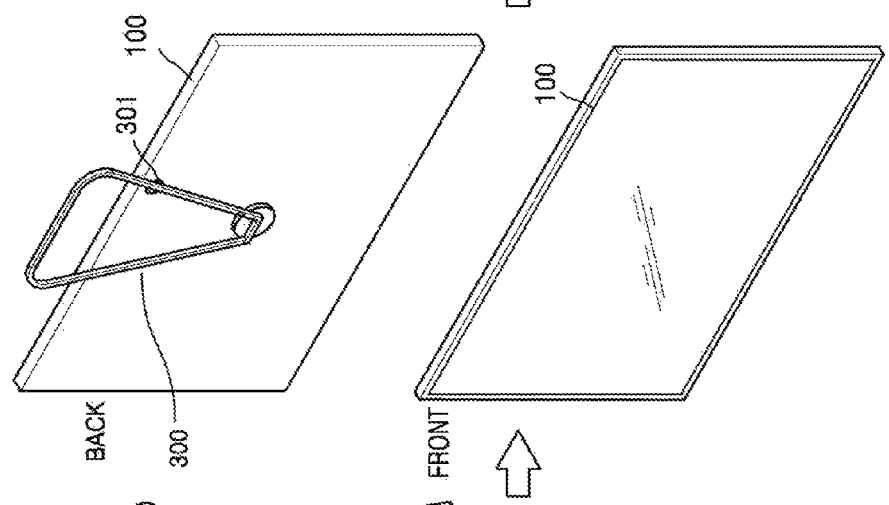
Figure 7A:
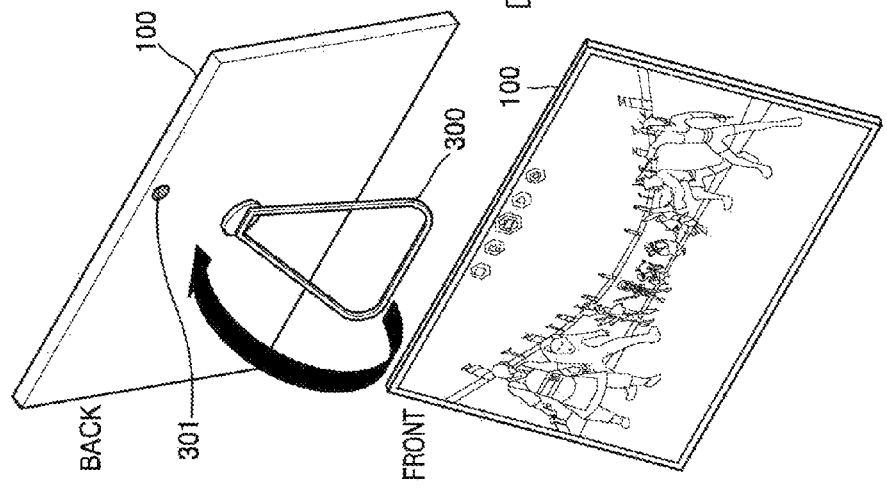

FIGS. 7A-7C are diagrams illustrating an example in which, in the case that a handle 300 as illustrated in FIG. 3 is attached to a multimedia device 100, power being supplied to a display of the multimedia device 100 is blocked when it is determined that the handle 300 is used, and then power is supplied to the display of the multimedia device 100 when it is determined that the handle 300 is not used, and the multimedia device 100 provides multimedia content.

FIG. 7A illustrates a state in which the multimedia device 100 provides multimedia content and the handle 300 is not used. FIG. 7B illustrates a state in which as the handle 300 is used, power being supplied to the display of the multimedia device 100 is blocked and thus multimedia content is not provided. FIG. 7C illustrates a state in which the handle 300 is not used is sensed after power being supplied to the display of the multimedia device 100 has been blocked, power is supplied to the display of the multimedia device 100 and the multimedia device 100 provides multimedia content again.

Figure 8:
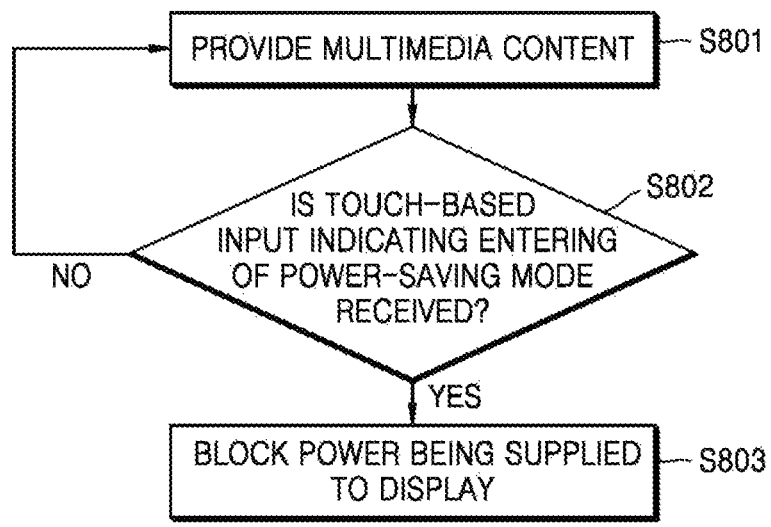
FIG. 8 is a flowchart illustrating an example method by which a multimedia device manages power based on a touch-based input.

FIG. 8 is a flowchart illustrating an example method by which the multimedia device 100 manages power based on a touch-based input.

Referring to FIG. 8, the multimedia device 100 provides multimedia content in operation S801. In operation S801, the multimedia device 100 may provide multimedia content as described in operation S201.

In operation S802, the multimedia device 100 determines whether a touch-based input indicating entry into a power-saving mode is received. When a display of the multimedia device 100 includes a touch screen, the touch-based input may be received based on the touch screen. However, in the present example embodiment, the touch-based input is not limited thereto.

For example, when the multimedia device 100 is controlled by a remote controller and the remote controller has a function for receiving a touch-based input, the multimedia device 100 may receive a touch-based input based on a touch-based input unit of the remote controller.

The touch-based input indicating entry into a power-saving mode may, for example, be a "five finger pinch in". The "five finger pinch in" is a gesture of grapping a screen. The touch-based input indicating entry into a power-saving mode may, for example, be a "four finger swipe". The "four finger swipe" is a gesture of swiping a screen by using four fingers. The touch-based input indicating entry into a power-saving mode may, for example, be a "press and tap". The "press and tap" is a gesture of putting one finger on a screen and briefly touching another finger on the screen. In the present example embodiment, the touch-based input indicating entry into a power-saving mode is not limited to those described above and may be any suitable touch-based input or gesture.

If it is determined that the touch-based input indicating entry into a power-saving mode is received, the multimedia device 100 may block power being supplied to the display, and enter a power-saving mode (operation S803). If it is determined that the touch-based input indicating entry into a power-saving mode is not received, the multimedia device 100 may continuously perform an operation of providing multimedia content.

Figure 9B:
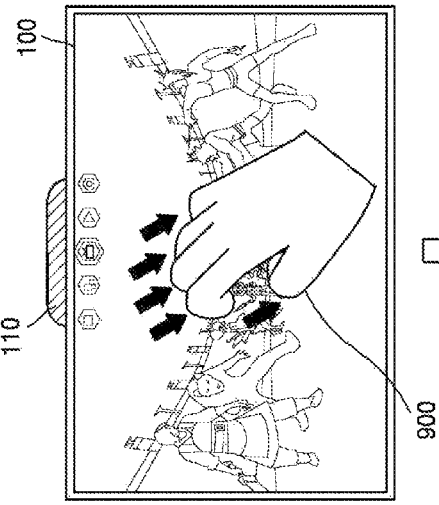
FIGS. 9A-9C are diagrams illustrating an example in which a multimedia device manages the power of the multimedia device based on a touch-based input indicating entry into a power-saving mode.
Figure 9C:
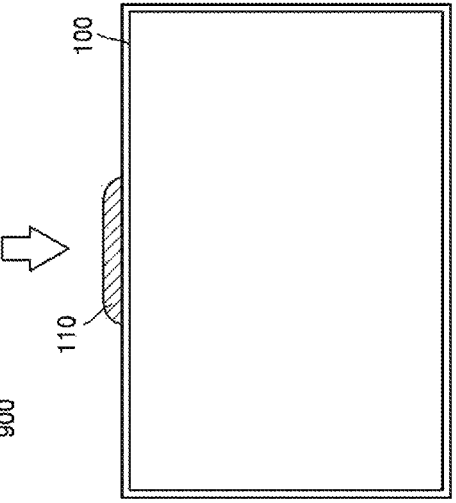
Figure 9A:
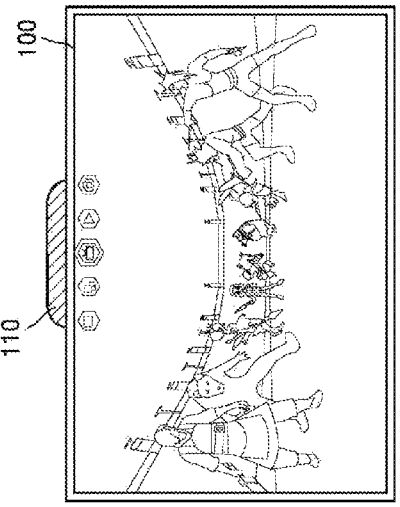

FIGS. 9A-9C are diagrams illustrating an example in which a multimedia device 100 manages the power of the multimedia device 100 based on a touch-based input indicating entry into a power-saving mode.

FIG. 9A illustrates a state in which the multimedia device 100 provides multimedia content. FIG. 9B illustrates a state in which a display of the multimedia device 100 is a touch screen and a "five finger pinch in" is received through the touch screen. FIG. 9C illustrates a state in which as the "five finger pinch in" is received, and power being supplied to the display of the multimedia device 100 is blocked and the multimedia device 100 enters a power-saving mode.

Figure 10:
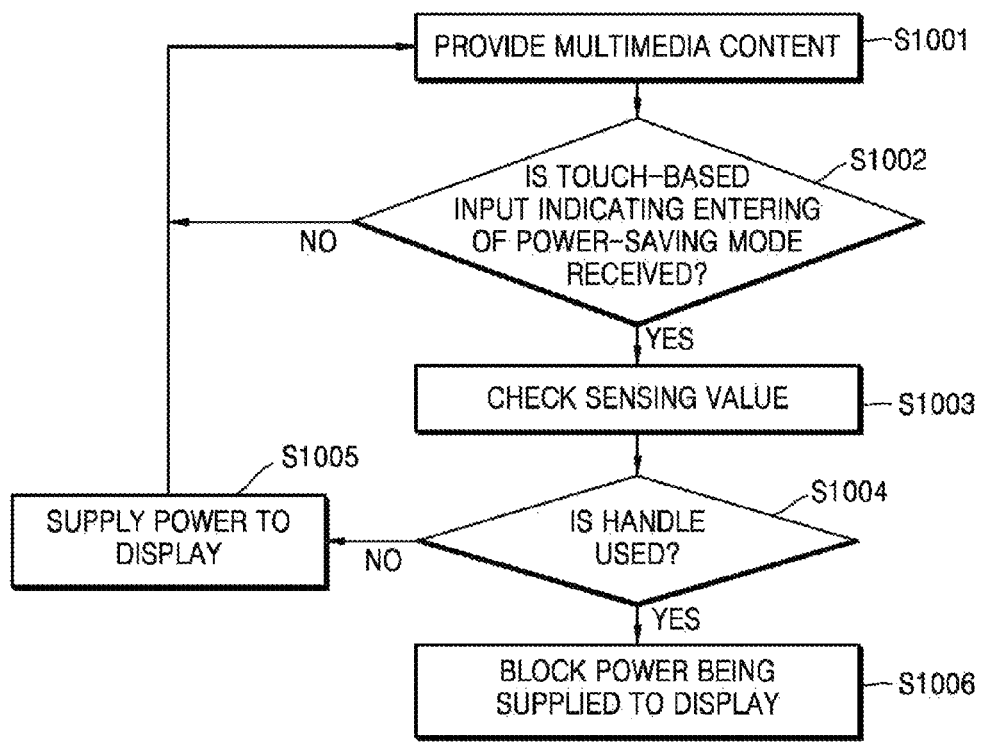
FIG. 10 is a flowchart illustrating an example method by which a multimedia device manages power based on a touch-based input and a handle.

FIG. 10 is a flowchart illustrating an example method by which the multimedia device 100 manages power based on a touch-based input and the handle 110.

Referring to FIG. 10, the multimedia device 100 provides multimedia content in operation S1001. In operation S1001, the multimedia device 100 may provide multimedia content as described in operation S201.

In operation S1002, the multimedia device 100 determines whether a touch-based input indicating entry into a power-saving mode is received. When a display of the multimedia device 100 includes a touch screen, the touch-based input may be received based on the touch screen. However, in the present example embodiment, the touch-based input is not limited thereto. For example, when the multimedia device 100 is controlled by a remote controller and the remote controller has a function for receiving a touch-based input, the multimedia device 100 may receive a touch-based input based on a touch-based input unit of the remote controller.

The touch-based input indicating entry into a power-saving mode may, for example, be a "five finger pinch in". The "five finger pinch in" is a gesture of grapping a screen. The touch-based input indicating an entry into a power-saving mode may, for example, be a "four finger swipe". The "four finger swipe" is a gesture of swiping a screen by using four fingers. The touch-based input indicating an entry into a power-saving mode may, for example, be a "press and tap". The "press and tap" is a gesture of putting one finger on a screen and briefly touching another finger on the screen. In the present example embodiment, the touch-based input indicating an entry into a power-saving mode is not limited to those described above, and may be any suitable touch-based input or gesture.

If it is determined that the touch-based input indicating entry into a power-saving mode is not received in operation S1002, the multimedia device 100 may proceed to operation S1001 and continuously provide multimedia content.

If it is determined that the touch-based input indicating entry into a power-saving mode is received, the multimedia device 100 checks a sensing value in operation S1003. The multimedia device 100 may reduce power consumption thereof, compared to a case in which the multimedia device 100 has to always check a sensing value.

If it is determined that the handle 110 is not used (operation S1004), the multimedia device 100 proceeds to operation S1005 and maintains providing power to the display, and then proceeds to operation S1001 and provides multimedia content again. After performing operation S1005, the multimedia device 100 may provide multimedia content, as described with reference to FIG. 5, in operation S1001.

If it is determined that the handle 110 is used (operation S1004), the multimedia device 100 may block power being provided to the display, and enter a power-saving mode (operation S1006).

Figure 11A:
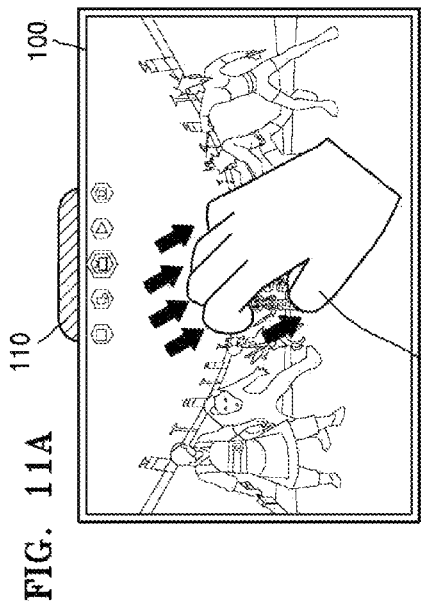
Figure 11C:
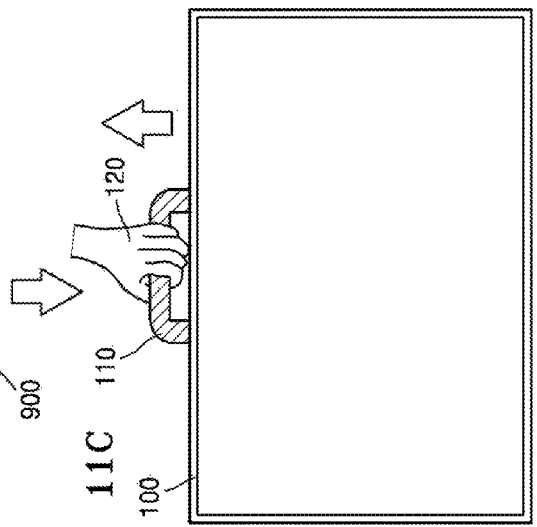
Figure 11A:
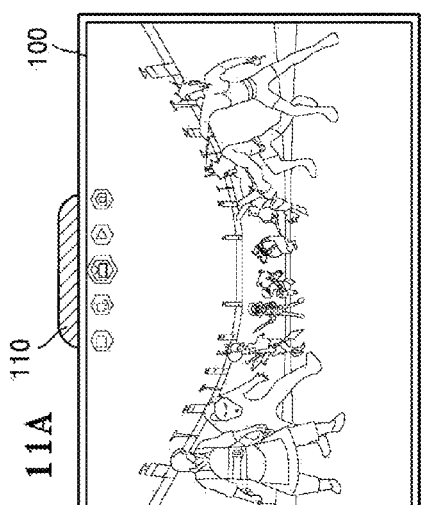

FIGS. 11A-11C are diagrams illustrating an example in which a multimedia device 100 manages the power of the multimedia device 100 based on a touch-based input indicating entry into a power-saving mode and a handle 110.

FIG. 11A illustrates a state in which the multimedia device 100 provides multimedia content. FIG. 11B illustrates a state in which a display of the multimedia device 100 is a touch screen and a "five finger pinch in" is received through the touch screen. FIG. 11C illustrates a state in which as the "five finger pinch in" is received and the handle 110 is used, power being supplied to the display of the multimedia device 100 is blocked and the multimedia device 100 enters a power-saving mode.

Figure 12:
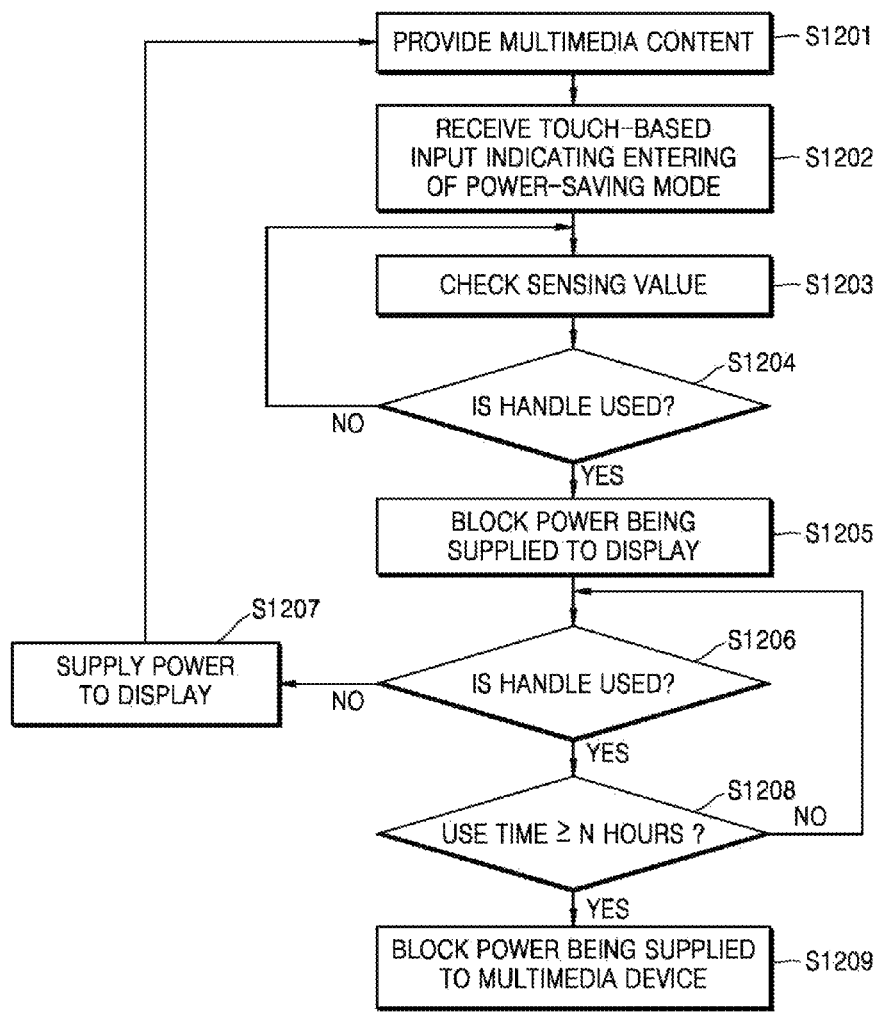
FIG. 12 is a flowchart illustrating an example method by which a multimedia device manages power being supplied to a display and power being supplied to the multimedia device, based on a touch-based input and a handle.

FIG. 12 is a flowchart illustrating an example method by which the multimedia device 100 manages power being supplied to a display and power being supplied to the multimedia device 100, based on a touch-based input and the handle 110. FIG. 12 illustrates an example in which when a sensing value indicates a state in which the handle 110 is not used, the sensing value is checked until the sensing value indicates a state in which the handle 110 is used.

Referring to FIG. 12, the multimedia device 100 provides multimedia content in operation S1201. In operation S1201, the multimedia device 100 may provide multimedia content as described in operation S201.

In operation S1202, the multimedia device 100 may determine whether a touch-based input indicating entry into a power-saving mode is received. When a display of the multimedia device 100 includes a touch screen, the touch-based input may be received based on a touch screen. However, in the present example embodiment, the touch-based input is not limited thereto. For example, when the multimedia device 100 is controlled by a remote controller and the remote controller has a function for receiving a touch-based input, the multimedia device 100 may receive a touch-based input based on a touch-based input unit of the remote controller. The touch-based input indicating entry into a power-saving mode may be the same as that described with reference to FIG. 10.

When the touch-based input indicating entry into a power-saving mode is received, the multimedia device 100 checks a sensing value in operation S1203. As a result of checking, if it is determined that the handle 110 is not used, based on the checked sensing value (operation S1204), the multimedia device 100 may continuously check a sensing value until the sensing value indicates a state in which the handle 110 is used. The multimedia device 100 may check the sensing value in a previously set cycle. The previously set cycle may be set or changed based on a user input.

If it is determined that the handle 110 is used, based on the sensing value (operation S1204), the multimedia device 100 blocks power being supplied to the display, to enter a power-saving mode (operation S1205).

After entering the power-saving mode, the multimedia device 100 determines whether the handle is used, based on a sensing value (operation S1206).

If it is determined that the handle 110 is not used (operation S1206), the multimedia device 100 supplies power to the display (operation S1207), and proceeds to operation 1201 and provides multimedia content. After performing operation S1207, the multimedia device 100 may provide multimedia content, as described with reference to FIG. 5, in operation S1201.

If it is determined that the handle 110 is used (operation S1206), the multimedia device 100 may compare a duration time, during which a sensing value indicating a state in which the handle 110 is used remains constant, to a previously set reference time N, and determine whether the duration time during which the sensing value remains constant is equal to or greater than the reference time N (operation S1208). For example, the reference time N is an integer. For example, the reference time N may be set to 30 minutes. The reference time N may be set or changed by a user. The duration time during which the sensing value remains constant may be referred to as a use time for which the handle 110 is used. The multimedia device 100 may measure the duration time during which the sensing value remains constant. The multimedia device 100 may use a counter to measure the duration time during which the sensing value remains constant.

If it is determined that the duration time during which the sensing value remains constant is not equal to or greater than the reference time N (operation S1208), the multimedia device 100 may proceed to operation S1206 and continuously sense whether the handle 110 is used or not, until the duration time during which the sensing value remains constant reaches the reference time N.

If it is determined that the duration time during which the handle 110 is used is equal to or greater than the reference time N (operation S1208), the multimedia device 100 may block power being supplied to the multimedia device 100 (operation S1209). Accordingly, power being supplied to all elements of the multimedia device 100 may be blocked.

Figure 13:
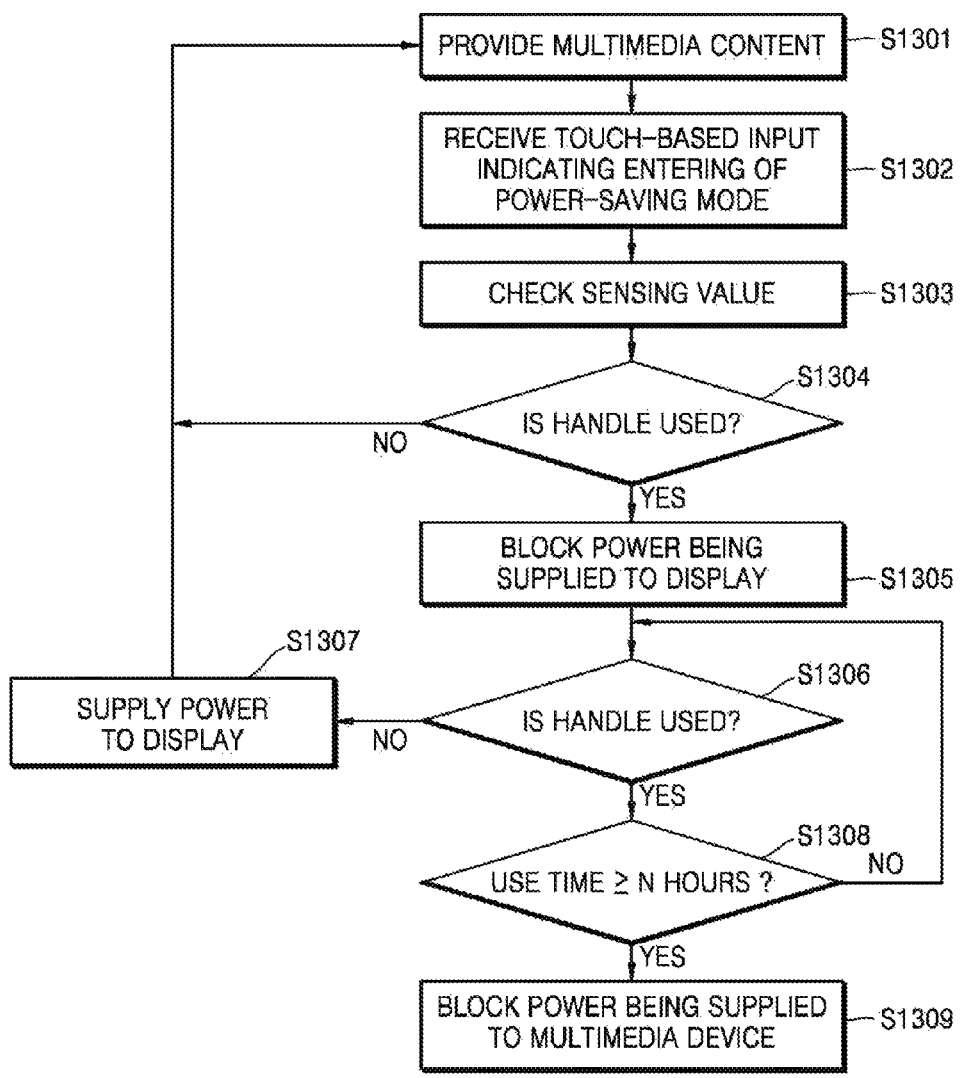
FIG. 13 is a flowchart illustrating an example method by which a multimedia device manages power being supplied to a display and power being supplied to the multimedia device, based on a touch-based input and a handle.

FIG. 13 is a flowchart illustrating an example method by which the multimedia device 100 manages power being supplied to a display and power being supplied to the multimedia device 100, based on a touch-based input and the handle 110. FIG. 13 illustrates an example in which, when a sensing value indicates a state in which the handle 110 is not used, the multimedia device 100 disregards a previously input touch-based input and provides multimedia content.

Referring to FIG. 13, the multimedia device 100 provides multimedia content in operation S1301. In operation S1301, the multimedia device 100 may provide multimedia content as described in operation S201.

In operation S1302, the multimedia device 100 determines whether a touch-based input indicating entry into a power-saving mode is received. The touch-based input may be the same as that described with reference to FIG. 12.

When the touch-based input indicating entry into a power-saving move is received, the multimedia device 100 checks a sensing value (operation S1303). If it is determined that the handle 110 is not used, based on the checked sensing value (operation S1304), the multimedia device 100 may proceed to operation S1301 and provide multimedia data/content, and may also check whether a touch-based input is received, and a sensing value of the sensor 112 again.

If it is determined that the handle 110 is used (operation S1304), the multimedia device 100 may block power being provided to a display, and enter a power-saving mode (operation S1305).

After entering the power-saving mode, the multimedia device 100 determines whether the handle 110 is used, using a sensing value (operation S1306). If it is determined that the handle 110 is not used (operation S1306), the multimedia device 100 may proceed to operation S1307 and supply power to a display, and then may proceed to operation S1301 and provide multimedia content.

If it is determined that the handle 110 is used (operation S1306), the multimedia device 100 compares a duration time, during which a sensing value indicating a state in which the handle 110 is used remains constant, to a previously set reference time N, and determines whether the duration time during which the sensing value remains constant is equal to or greater than the reference time N (operation S1308).

If it is determined that the duration time during which the sensing value remains constant is not equal to or greater than the reference time N (operation S1308), the multimedia device 100 determines whether the handle 110 is used or not, using a sensing value until the duration time during which the sensing value remains constant is equal to or greater than the reference time N.

If it is determined that the duration time during which the sensing value remains constant is equal to or greater than the reference time N (operation S1308), the multimedia device 100 may block power being supplied to the multimedia device 100 (operation S1309). Accordingly, power being supplied to all elements of the multimedia device 100 may be blocked.

Figure 14:
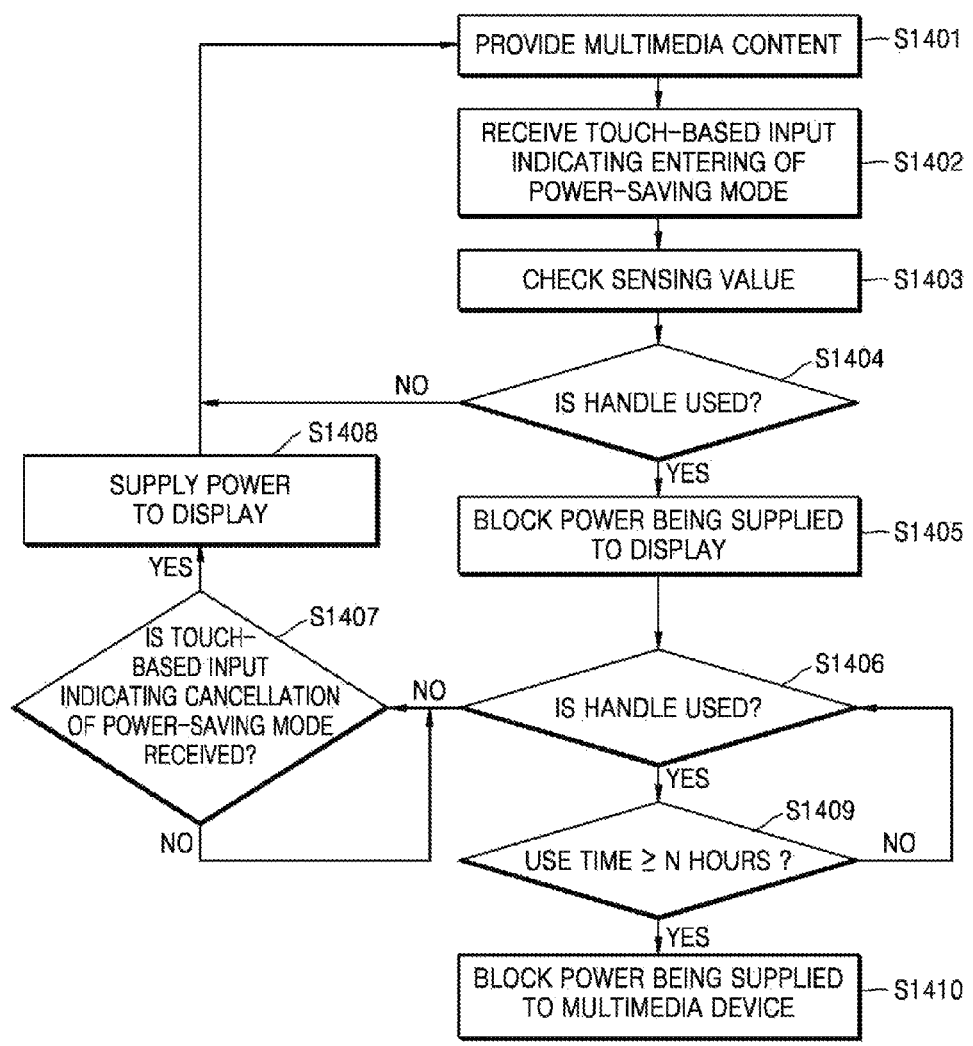
FIG. 14 is a flowchart illustrating an example method by which a multimedia device manages power being supplied to a display and power being supplied to the multimedia device, based on a touch-based input and a handle.

FIG. 14 is a flowchart illustrating an example method by which the multimedia device 100 manages power being supplied to a display and power being supplied to the multimedia device 100, based on a touch-based input and the handle 110. FIG. 14 illustrates an example in which both a touch-based input indicating entry into a power-saving mode and a touch-based input indicating the cancellation of the power-saving mode are considered.

Referring to FIG. 14, the multimedia device 100 provides multimedia content in operation S1401. In operation S1401, the multimedia device 100 may provide multimedia content as described in operation S201.

In operation S1402, the multimedia device 100 determines whether a touch-based input indicating entry into a power-saving mode is received. The touch-based input may be the same as that described with reference to FIG. 12.

When the touch-based input indicating entry into the power-saving mode is received, the multimedia device 100 checks a sensing value (operation S1403). If it is determined that the handle 110 is not used, based on the checked sensing value (operation S1404), the multimedia device 100 may proceed to operation S1401 and provide multimedia content, and may also check whether a touch-based input is received, and a sensing value of the sensor 112 again.

If it is determined that the handle 110 is used (operation S1404), the multimedia device 100 may block power being provided to a display, and enter a power-saving mode (operation S1405).

After entering the power-saving mode, the multimedia device 100 determines whether the handle 110 is used, using a sensing value (operation S1406). If it is determined that the handle 110 is not used (operation S1406), the multimedia device 100 proceeds to operation S1407 and determines whether a touch-based input indicating the cancellation of the power-saving mode is received.

The touch-based input indicating the cancellation of the power-saving mode may be set based on the touch-based input indicating entry into the power-saving mode. For example, when the touch-based input indicating entry into the power-saving mode is a "five finger pinch in", the touch-based input indicating the cancellation of the power-saving mode may be set to a "five finger pinch out". The "five finger pinch out" is a gesture of spreading five fingers.

When the touch-based input indicating entry into the power-saving mode is a "four finger right swipe", the touch-based input indicating the cancellation of the power-saving mode may be set to a "four finger left swipe". When the touch-based input indicating entry into the power-saving mode is a "press and tap", the touch-based input indicating the cancellation of the power-saving mode may be set to a "press and double tap". The multimedia device 100 may provide guide information for the touch-based input indicating the cancellation of the power-saving mode. The guide information may have a voice signal form.

In the present example embodiment, the touch-based input indicating the cancellation of the power-saving mode is not limited to that described above. For example, the touch-based input indicating the cancellation of the power-saving mode may be set regardless of the touch-based input indicating an entry into the power-saving mode.

When it is determined that the touch-based input indicating the cancellation of the power-saving mode is not received (operation S1407), the multimedia device 100 may block power being supplied to a display, until the touch-based input indicating the cancellation of the power-saving mode is received.

When it is determined that the touch-based input indicating the cancellation of the power-saving mode is received (operation S1407), the multimedia device 100 may proceed to operation S1408 and provide power to the display, and then may proceed to operation S1401 and provide multimedia content.

If it is determined that the handle 110 is used (operation S1406), the multimedia device 100 compares a duration time, during which a sensing value indicating a state in which the handle 110 is used remains constant, to a previously set reference time N, and determines whether the duration time during which the sensing value remains constant is equal to or greater than the reference time N (operation S1409).

If it is determined that the duration time during which the sensing value remains constant is not equal to or greater than the reference time N (operation S1409), the multimedia device 100 determines whether the handle 110 is used or not, using a sensing value until the duration time during which the sensing value remains constant is equal to or greater than the reference time N.

If it is determined that the duration time during which the sensing value remains constant is equal to or greater than the reference time N (operation S1409), the multimedia device 100 may block power being supplied to the multimedia device 100 (operation S1410). Accordingly, power being supplied to all elements of the multimedia device 100 may be blocked.

Figure 15:
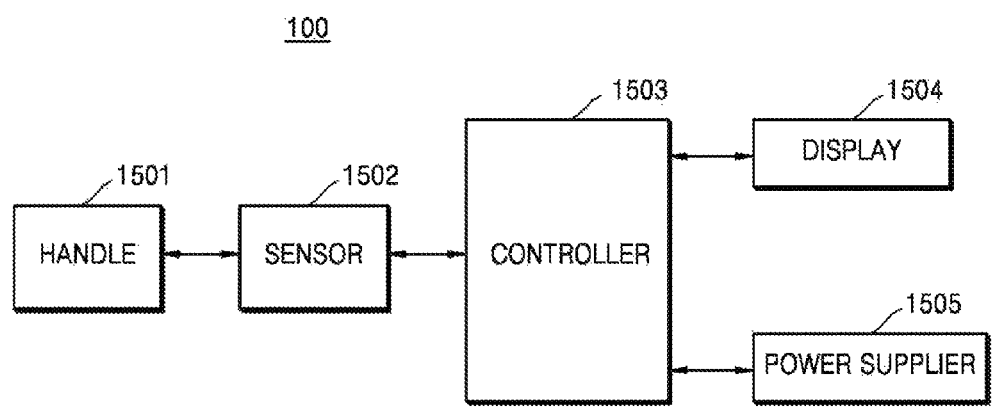
FIG. 15 is a block diagram illustrating an example multimedia device.

FIG. 15 is a block diagram illustrating an example multimedia device 100.

Referring to FIG. 15, the multimedia device 100 includes a handle 1501, a sensor (e.g., including sensing or sensor circuitry) 1502, a controller (e.g., including processing circuitry) 1503, a display (e.g., including a display panel and display driving circuitry) 1504, and a power supplier 1505. In the present example embodiment, elements of the multimedia device 100 are not limited to those illustrated in FIG. 15.

The handle 1501 may be configured like the handle 110 of FIG. 1 or the handle 300 of FIG. 3. The handle 1501 may be used to move the multimedia device 100.

The sensor 1502 may be configured like the sensor 112 of FIG. 1 or the sensor 301 of FIG. 3. The sensor 1502 may be configured to sense whether the handle 1501 is used.

The controller 1503 may, for example, be a processor configured to control all functions of the multimedia device 100. The controller 1503 may be loaded with an operating system (OS) program of the multimedia device 100 to operate the multimedia device 100. A program loaded in the controller 1503 may include a power management application.

The power management application of the multimedia device 100 may be configured based on the flowchart illustrated in FIG. 2 or FIG. 5. Accordingly, if a sensing value of the sensor 1502 indicates a state in which that the handle 1501 is used, when multimedia is displayed on the display 1504, the controller 1503 may be configured to control the power supplier 1505 to block power being supplied to the display 1504.

After power being supplied to the display 1504 is blocked, the controller 1503 may be configured to determine whether the handle 1501 is used, by using a sensing value of the sensor 1502. When it is determined that the handle 1501 is not used, the controller 1503 may be configured to control the power supplier 1506 to supply power to the display 1504. When power is supplied to the display 1504, the controller 1503 may be configured to display multimedia content on the display 1504.

When it is determined that the handle 1501 is used, using the sensing value of the sensor 1502 after power being supplied to the display 1504 is blocked, the controller 1503 may be configured to compare a duration time, during which a sensing value indicating a state in which the handle 110 is used remains constant, to a previously set time.

When the duration time during which the sensing value remains constant is equal to or greater than the previously set time, the controller 1503 may be configured to control the power supplier 1506 to block power being supplied to the multimedia device 100. Accordingly, power being supplied to all elements of the multimedia device 100 may be blocked.

The display 1504 may display multimedia content. The display 1504 may include, for example, a liquid crystal display (LCD), a thin film transistor-liquid crystal display (TFT-LCD), an organic light-emitting diode (OLED), a flexible display, a three-dimensional (3D) display, or an electrophoretic display (EPD), or the like.

The power supplier 1505 may be configured to provide the power of the multimedia device 100. The power supplier 1505 may include a battery. The power supplier 1505 may be charged by power supplied from an external power supply device. The power supplier 1506 may be attachable or detachable to the multimedia device 100.

Figure 16:
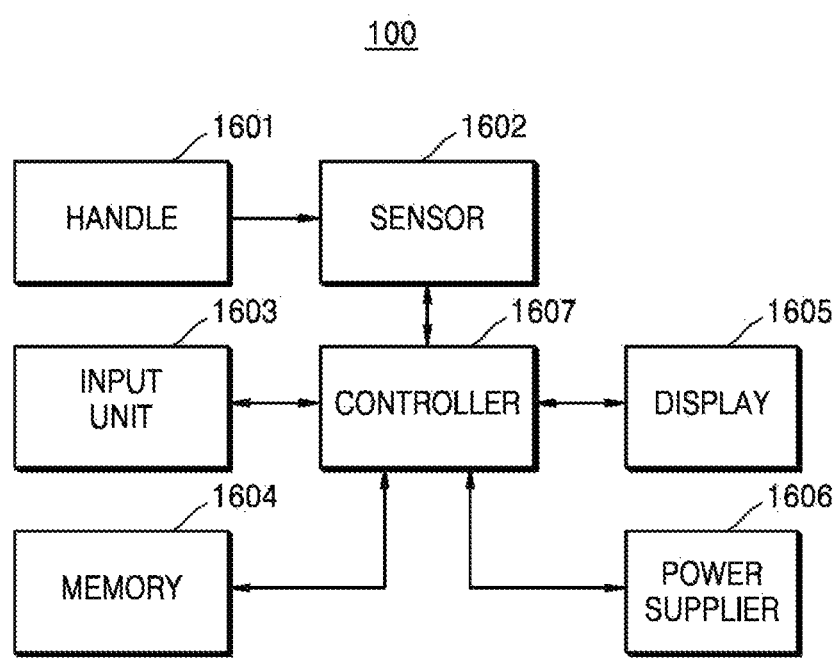
FIG. 16 is a block diagram illustrating an example multimedia device.

FIG. 16 is a block diagram illustrating an example multimedia device 100.

Referring to FIG. 16, the multimedia device 100 includes a handle 1601, a sensor (e.g, including a sensing or sensor circuitry) 1602, an input unit (e.g., including input circuitry) 1603, a memory 1604, a display (e.g., including a display panel and display driving circuitry) 1605, a power supplier 1606, and a controller (e.g., including processing circuitry) 1607. In the present example embodiment, elements of the multimedia device 100 are not limited to those illustrated in FIG. 16.

The handle 1601, the sensor 1602, the display 1605, and the power supplier 1606 may be configured and operate similarly to the handle 1501, the sensor 1502, the display 1504, and the power supplier 1505, respectively, illustrated in FIG. 15.

The input unit 1603 may receive a touch-based input, for example, from a user. The input unit 1603 may receive a touch-based input indicating that a power-saving mode has been entered or a touch-based input indicating the cancellation of a power-saving mode. The input unit 1603 enables an interaction between, for example, a user and the multimedia device 100 and thus may be referred to as a user interface. The input unit 1603 may receive a user input based on a screen that is displayed on the display 1605.

The input unit 1603 may include, for example, at least one selected from among a key pad, a dome switch, a touch pad (e.g., a touch pad using a contact-type capacitive method, a pressure-type resistive film method, an infrared detection method, a surface ultrasonic conduction method, an integral-type tension measurement method, or a piezoelectric effect method, or the like), a jog wheel, and a jog switch or any other suitable input circuitry. However, in the present example embodiment, the input unit 1603 is not limited to those described above.

Input information of a user which may be input through the input unit 1603 may include at least one selected from among touch-based input information, movement-based input information, vision-based input information, and user voice-based input information, or the like, but is not limited thereto.

The touch-based input information may include, for example, a tap or touch, a double tap, a press, a pan, a long tap or long touch, a touch and hold, a touch and drag, a drag, a panning, a flick, a drag and drop, a pinch-out, a pinch-in, a rotation, or a sweep, but is not limited thereto.

The movement-based input information may include, for example, input information based on a movement-based user gesture of the device 100 (e.g., waving a device, rotating a device, and lifting a device), but is not limited thereto.

The vision-based input information may include, for example, information recognized by analyzing input image obtained by a camera (not shown) included in the multimedia device 100 without a contact between the multimedia device 100 and a user, but is not limited thereto.

The memory 1604 may include an OS program of the multimedia device 100 and various applications. The various applications may include, for example, the power management application described with reference to FIG. 15. The memory 1604 may store at least one multimedia that may be provided. The memory 1604 may store a search application that may search for stored multimedia based on a search word described with reference to FIG. 2.

Programs stored in the memory 1604 may be classified into a plurality of modules, such as a broadcast reception module (or a DMB module), a mobile communication module, a Wi-Fi module, a Bluetooth module, a sensor module, a GPS module, a video playback module, an audio reproduction module, a power module, a touch screen module, an UI module, and an application module.

The memory 1604 may include a flash memory-type memory, a hard disk-type memory, a multimedia card micro-type memory, a card-type memory (e.g., an SD or XD memory), random access memory (RAM), static random access memory (RAM), read-only memory (ROM), electrically erasable programmable read-only memory (EEPROM), programmable read-only memory (PROM), a magnetic memory, a magnetic disc, or an optical disc-type storage medium, or the like.

The controller 1607 may be configured to read an application stored in the memory 1604 and thus perform an operation. When a touch-based input indicating entry into a power-saving mode or a touch-based input indicating the cancellation of a power-saving mode is input through the input unit 1603, the controller 1607 may be configured to operate as described by the flowchart shown in FIG. 8, 10, 12, 13, or 14.

The controller 1607 may be configured to control the entire operation of the multimedia device 100, like the controller 1503 of FIG. 15.

Figure 17:
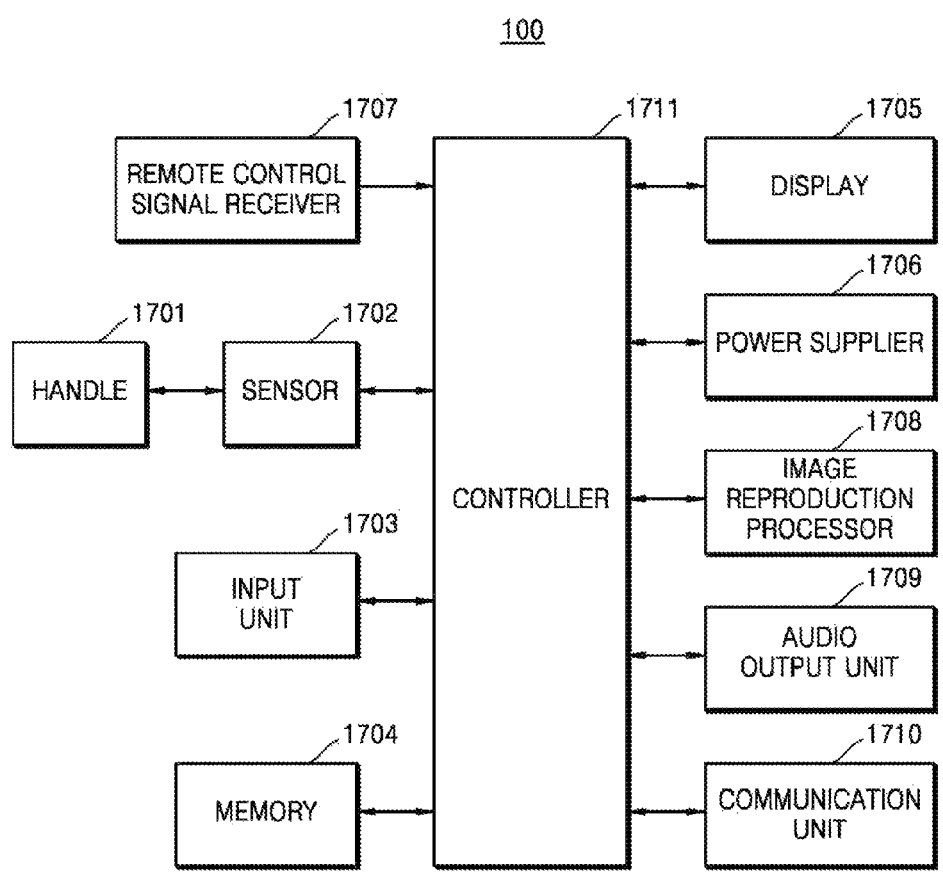
FIG. 17 is a block diagram illustrating an example multimedia device.

FIG. 17 is a block diagram illustrating an example multimedia device 100.

Referring to FIG. 17, the multimedia device 100 may include a handle 1701, a sensor (e.g., including sensing or sensor circuitry) 1702, an input unit (e.g., including input circuitry) 1703, a memory 1704, a display (e.g., including a display panel and display driving circuitry) 1705, a power supplier 1706, a remote control signal receiver 1707, an image reproduction processor (e.g., including processing circuitry) 1708, an audio output unit (e.g., including audio output circuitry) 1709, a communication unit (e.g., including various communication circuitry) 1710, and a controller (e.g., including processing circuitry) 1711, but is not limited thereto.

The handle 1701, the sensor 1702, the input unit 1703, the memory 1704, the display 1705, and the power supplier 1706 may be configured similarly to the handle 1601, the sensor 1602, the input unit 1603, the memory 1604, the display 1605, and the power supplier 1606, respectively, illustrated in FIG. 16.

The remote control signal receiver 1707 may receive, for example, a signal that is transmitted from a remote controller for remotely controlling the multimedia device 100.

The image reproduction processor 1708 processes image data, received from the communication unit 1710 or stored in the memory 1704, to display processed image data on the display 1705.

The audio output unit 1709 may output audio data received from the communication unit 1710 or stored in the memory 1704. The audio output unit 1709 may output a sound signal (e.g., an alarm sound) related to a function that is performed by the multimedia device 100. The audio output unit 1709 may output an alarm sound when a power-saving mode is entered or cancelled.

The audio output unit 1709 may include, for example, a speaker, a buzzer, or the like, but is not limited thereto.

The communication unit 1710 may include one or more elements for communication between the multimedia device 100 and at least one external device (e.g., a broadcast content providing device, a smart phone, a wearable device such as a smart watch, an IoT network-based device, or another multimedia device). For example, the communication unit 1710 may include at least one selected from short-range wireless communication circuitry, mobile communication circuitry, and a broadcast receiver. However, in the present example embodiment, elements and circuitry that are included in the communication unit 1710 are not limited to those described above.

The short-range wireless communication circuitry may include, for example, a Bluetooth communication module, a Bluetooth low energy (BLE) communication module, a near field wireless communication module (e.g., an RFID module), a wireless local area network (WLAN) communication module (e.g., a WI-FI module), a Zigbee communication module, an Ant+ communication module, a Wi-Fi direct (WFD) communication module, a beacon communication module, or an ultra wide band (UWB) communication module. However, in the present example embodiment, the short-range wireless communication circuitry is not limited to those described above. For example, the short-range wireless communication circuitry may include an infrared data association (IrDA) communication module.

The mobile communication circuitry may transmit or receive a wireless signal to or from at least one selected from among a base station, an external device, and a server in a mobile communication network, or the like. The wireless signal may include a voice call signal, a video telephony call signal, or various types of data according to text/multimedia message transmission and reception, or the like.

The broadcast receiver may receive a broadcast signal and/or broadcast-related information from the outside through a broadcast channel. The broadcast channel may include at least one selected from a satellite channel, a terrestrial channel, and a radio channel, but is not limited thereto.

The communication unit 1710 may transmit at least one piece of information generated by the multimedia device 100 to at least one external device or receive information transmitted from at least one external device.

The communication unit 1710 may include a global positioning system (GPS) receiver.

The multimedia device 100 may further include a gyroscope sensor for measuring an azimuth angle of the multimedia device 100, an accelerometer sensor for measuring the tilt and acceleration of the multimedia device 100 based on the surface of the earth, and/or a geomagnetic sensor for sensing north, south, east and west orientations based on the multimedia device 100, other than elements illustrated in FIG. 17.

Also, the multimedia device 100 may further include a temperature/humidity sensor, a gravity sensor, an altitude sensor, a chemical sensor (e.g., an odorant sensor), a pressure sensor, a fine dust measurement sensor, an ultraviolet sensor, an ozone sensor, a carbon dioxide ($CO_2$) sensor, and/or a network sensor (e.g., a network sensor based on Wi-Fi, Bluetooth, 3G, long term evolution (LTE), or/and near field communication (NFC)).

Sensing values that are output from the sensors described above are transmitted to the controller 1711.

The controller 1711 may be configured to operate based on the flowchart illustrated in FIG. 2, 5, 8, 10, 12, 13, or 14.

FIG. 18 is a configuration diagram of a system 1900 including a multimedia device 100.

Referring to FIG. 18, the system 1800 may include, for example, the multimedia device 100, an IoT network-based device 1810, a wearable device 1820, and a broadcast content providing device 1830. In the present example embodiment, the system 1800 is not limited to that illustrated in FIG. 18. For example, the system 1800 may include fewer elements than those illustrated in FIG. 18. The system 1800 may include more elements than those illustrated in FIG. 18.

The multimedia device 100 may, for example, be a portable device, and a handle 110 that is used when the multimedia device 100 is moved is attached to the multimedia device 100.

The IoT network-based device 1810 may include, for example, a smart appliance or smart office equipment, or the like.

The wearable device 1820 may include, for example, a device, such as smart glasses, a smart watch, a smart band (e.g., a smart waist band or a smart hair band), a smart clip, a smart accessory (e.g., a smart ring, a smart bracelet, a smart anklet, a smart hairpin, or a smart necklace), a smart body guard (e.g., a smart knee guard or a smart elbow guard), a smart shoe, a smart glove, smart clothing, a smart hat, a smart artificial leg for a disabled person, or a smart artificial arm for a disabled person, or the like, but is not limited thereto.

The broadcast content providing device 1830 may include, for example, a server that provides broadcast content.

The example embodiments may be written as computer programs and may be implemented in general-use digital computers that execute the programs using a non-transitory computer readable recording medium. The non-transitory computer readable recording medium may be any usable medium that may be accessed by a computer, and may include any usable medium, such as, a volatile and non-volatile medium and a discrete type and non-discrete type medium. Also, the non-transitory computer readable recording medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium may include other data of modulated signal, such as, a computer readable command, a data structure, a program module, or a carrier signal, or other transmission mechanism, and an arbitrary information medium.

The example embodiments are merely examples, and thus, it will be understood by those of ordinary skill in the art that various changes in form and details may be made therein without departing from the spirit and scope of the disclosure. Therefore, the example embodiments should be considered in descriptive sense only and not for purposes of limitation. For example, each constituent element that is described as a singular form may be embodied in distributed forms. Also, constituent elements that are described in distributed forms may be embodied in a combined form.

Therefore, the scope of the disclosure is defined not by the detailed description but by the appended claims, and all variations within the scope will be construed as being included in the example embodiments.

What is claimed is:

1. A multimedia device comprising:
    a display configured to display multimedia content;
    a handle attached to the multimedia device;
    a sensor configured to sense whether the handle is in a first state or in a second state used;
    a power supplier configured to supply power to the multimedia device; and
    a controller configured to control the power supplier to block power being supplied to the display, when a sensing value received from the sensor indicates that the handle is in the first a state;
    wherein the first state is a state in which the handle is used in a predetermined fashion and
    the second state is a state in which the handle is not used.

2. The multimedia device of claim 1, wherein the sensor is configured to sense whether the handle is used after the power being supplied to the display is blocked,
    wherein the controller is configured to control the power supplier to provide power to the display when the sensing value indicates a state in which the handle is not used, and the display is configured to display the multimedia content when the power is supplied to the display.

3. The multimedia device of claim 1, wherein the sensor is configured to sense whether the handle is used after the power being supplied to the display is blocked,
    wherein when a duration time, during which a sensing value indicating a state in which the handle is used remains constant, is equal to or greater than a set reference time, the controller is configured to control the power supplier to block power being supplied to the multimedia device.

4. The multimedia device of claim 1, wherein the multimedia device further comprises input circuitry configured to receive a touch-based input,
    wherein the controller is configured to receive a sensing value from the sensor when an input indicating entry into a power-saving mode is received from the input circuitry.

5. The multimedia device of claim 1, wherein the state in which the handle is used comprises a state in which the handle is grasped.

6. The multimedia device of claim 1, wherein when the handle is configured to act as a stand for the multimedia device, the state in which the handle is used comprises a state in which the handle is folded.

7. The multimedia device of claim 1, further comprising a communication unit including communication circuitry, the communication unit configured to receive the multimedia content.

8. A method of managing power of a multimedia device, comprising:
    providing multimedia content using a multimedia device;
    sensing whether a handle attached to the multimedia device is in a first state or in a second state; and
    blocking power being supplied to a display of the multimedia device, when a sensing value indicates that the handle is in the first state,
    wherein the first state is a state in which the handle is used in a predetermined fashion and the second state is a state in which the handle is not used.

9. The method of claim 8, further comprising supplying power to the display to display the multimedia content on the display when the sensing value indicates a state in which the handle is not used, after the blocking of power being supplied to the display.

10. The method of claim 8, further comprising blocking power being supplied to the multimedia device when a duration time during which a sensing value indicating a state in which the handle is used remains constant, is equal to or greater than a set reference time after the blocking of power that is supplied to the display.

11. The method of claim 8, further comprising receiving a touch-based input indicating entry into a power-saving mode, wherein when the touch-based input is received, sensing of whether the handle is used is performed.

12. The method of claim 8, wherein the state in which the handle is used comprises a state in which the handle is grasped.

13. The method of claim 8, wherein when the handle has a form in which the handle acts as a stand for the multimedia device, the state in which the handle is used comprises a state in which the handle is folded.

14. A non-transitory computer-readable recording medium having recorded thereon a program which, when executed, causes the multimedia device to perform the operations of claim 8.

* * * * *